United States Patent
Entwistle et al.

(10) Patent No.: US 6,708,725 B2
(45) Date of Patent: Mar. 23, 2004

(54) VALVE, PARTICULARLY SOLENOID VALVE

(75) Inventors: Richard Thomas Entwistle, Sydals (DK); Hardy Jepsen, Sønderborg (DK)

(73) Assignee: Danfoss A/S, Nordborg (DK)

( * ) Notice: Subject to any disclaimer, the term of this patent is extended or adjusted under 35 U.S.C. 154(b) by 44 days.

(21) Appl. No.: 10/027,085

(22) Filed: Dec. 20, 2001

(65) Prior Publication Data
US 2002/0079006 A1 Jun. 27, 2002

(30) Foreign Application Priority Data
Dec. 21, 2000 (DE) .......................... 100 64 357

(51) Int. Cl.⁷ .................... F15B 13/044; F16K 1/14
(52) U.S. Cl. .............. 137/625.65; 251/52; 251/129.14; 251/129.19; 251/318
(58) Field of Search ................... 137/625.65, 901; 251/52, 129.14, 129.19, 318

(56) References Cited

U.S. PATENT DOCUMENTS

| 4,030,520 A | 6/1977 | Sands |
| 4,962,791 A | * 10/1990 | Rott ............... 137/901 |
| 5,160,116 A | 11/1992 | Sugiura et al. |
| 5,549,274 A | * 8/1996 | Buchanan et al. ..... 251/129.14 |
| 5,944,047 A | * 8/1999 | Veret et al. ............ 251/129.14 |
| 6,336,470 B1 | * 1/2002 | Zapf ..................... 251/129.14 |

FOREIGN PATENT DOCUMENTS

| DE | 37 32 446 A1 | 4/1989 |
| DE | 41 29 638 A1 | 3/1993 |
| DE | 42 28 059 A1 | 3/1994 |
| DE | 44 06 804 A1 | 9/1995 |
| DE | 198 33 744 C1 | 11/1999 |

* cited by examiner

Primary Examiner—Gerald A. Michalsky
(74) Attorney, Agent, or Firm—McCormick, Paulding & Huber LLP

(57) ABSTRACT

The invention concerns a valve, particularly a solenoid valve, with an inlet connection and an outlet connection, having between them a shut-off device with a valve seat and a closure member. In such a valve, it is endeavoured to obtain a small output with a simple design. For this purpose, the closure member has a closing element and a tappet separate from the closing element, the closing element being held in a guiding arrangement.

11 Claims, 2 Drawing Sheets

VALVE, PARTICULARLY SOLENOID VALVE

FIELD OF THE INVENTION

The invention concerns a valve, particularly a solenoid valve, with an inlet connection and an outlet connection, having between them a shut-off device with a valve seat and a closure member.

BACKGROUND AND SUMMARY OF THE INVENTION

In the following, the invention is described on the basis of a valve, which is meant for a humidification system. Such a valve controls relatively small amounts of fluid, for example, one to five liters per minute.

The invention is based on the task of providing a valve for small output quantities, with a simple design.

In a valve as mentioned in the introduction, this task is solved in that the closure member has a closing element and a tappet separate from the closing element, the closing element being held in a guiding arrangement.

Thus, it is possible to select practically any desired element as closing element, that is, also a relatively small component, which is able to close a correspondingly small valve seat. Since it is no longer required to fix the closing element on the tappet, the material for the closing element can be selected relatively freely. A material may be chosen that is particularly well suited for the fluid to be dosed. As the closing element is separated from the tappet, the guiding arrangement is provided to ensure that the closing element always returns to its bearing on the valve seat.

In a preferred embodiment, it is provided that in an open position the closing element bears on an auxiliary valve seat, which is connected with a tank connection, the guiding arrangement being arranged between the valve seat and the auxiliary valve seat. When the valve is open, the passage between the outlet connection and the tank connection is blocked. The fluid to be controlled thus gets direct from the inlet connection to the outlet connection. When, however, the valve is closed, the outlet connection is connected with the tank connection, as the closing element has released the auxiliary valve seat. Thus, a dropping at the outlet of the valve is prevented, when the valve is closed. In this connection, the guiding arrangement is exactly in the right position, that is, it guides the closing element from the valve seat to the auxiliary valve seat and back. Additionally, it constitutes a flow resistance, which prevents a short-circuiting between the valve seat and the auxiliary valve seat, while the closing element is moving.

Preferably, the guiding arrangement has an opening, in which the closing element is arranged, the diameter of the opening being equal to a diameter defined by the closing element plus a predetermined amount of play. Thus, it is ensured that the closing element can move without, or at least with only little, friction in the guiding arrangement. In addition, the opening in the guiding arrangement is substantially closed during movement of the closing element, during which the closing element bears on neither the valve seat nor the auxiliary valve seat, so that no unimpeded flow can take place from the valve seat to the auxiliary valve seat.

Preferably, the guiding arrangement includes a guide element in the shape of a bowl, which opens in the direction of the valve seat. The guide element ensures that the fluid cannot either create a short-circuiting path between the valve seat and the auxiliary valve seat by simply flowing around the closing element and the guiding arrangement. On the contrary, the path between the valve seat and the auxiliary valve seat is extended because of the guide element. The fluid is redirected by the bowl-shaped embodiment, so that a substantial throttling resistance is generated during the opening or closing movement of the closing element. This throttling resistance is sufficient to prevent significant fluid losses. In this connection, it must be observed that the time in which the risk of short-circuiting exists, is relatively short.

Preferably, the valve seat is arranged at the top of a pipe element that extends in the direction of the guide element. Thus, the fluid leaving the valve seat is initially redirected, before it can continue its flow. In the open state of the valve, this redirecting causes no problems, as the flow passage is small and throttling resistances play no significant part. For the opening process, however, the throttling resistance is sufficiently increased.

It is particularly preferred that the guide element and the pipe element create a gap, which is uniformly wide in the radial direction. Thus, the fluid is specifically guided, without being whirled. At increasing radial distance from the valve seat, the gap provides an ever increasing flow cross section, so that the fluid can propagate.

Preferably, an expanding zone is fitted to the gap, which zone opens radially in relation to the valve seat. Such an embodiment reduces the flow resistance in the open state, however, during the opening movement permits only a small fluid quantity to migrate from the valve seat to the auxiliary valve seat.

Preferably, the guide element has, in the area of the expanding zone, a radially extending circumferential flange. This circumferential flange can be used for the safe fixing of the guiding arrangement in the valve housing. The circumferential flange provides surfaces, which are perpendicular to the force, with which the fluid flowing through the valve seat acts upon the guiding arrangement.

Preferably, the guiding arrangement is made of a plastic material, however, the present invention is not limited in this regard. Plastic materials are easily shaped and adapted to predetermined functions. Additionally, they are able to work together with the closing element at low friction, which is particularly advantageous, when the valve is used for controlling the water in a humidification system.

Preferably, the guiding arrangement is fixed in a housing by means of a retaining part. The retaining part can be adapted to the housing and the guiding arrangement can be adapted to the retaining part. This simplifies the design of the housing and the mounting.

Preferably, the valve has a nominal output in the range from 1 to 5 l/min. Such small outputs are preferably required in irrigation structures.

It is also preferred that the closing element is made as a ball with a diameter in the range from 1 to 4 mm however the invention is not limited in this regard. A ball has the advantage that it needs no definite orientation in the valve to bear sealingly on the valve seat and on the auxiliary valve seat. Due to the small size, it is not possible to fix the ball on the tappet. In the embodiment shown, however, this is not necessary.

BRIEF DESCRIPTION OF THE DRAWINGS

In the following, the invention is described on the basis of a preferred embodiment in connection with the drawings, showing.

DETAILED DESCRIPTION OF THE PREFERRED EMBODIMENTS

Figure 1:
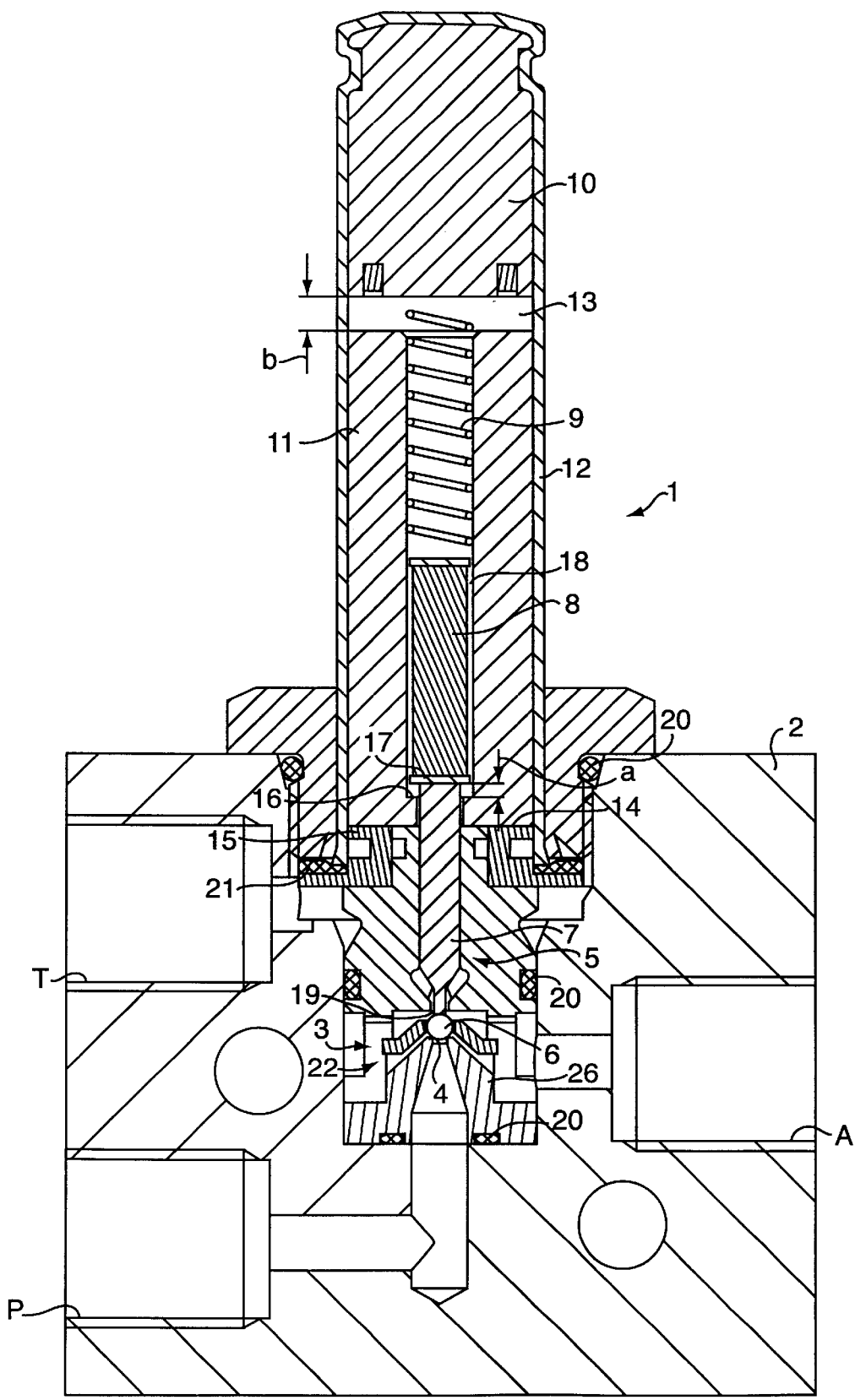
FIG. 1 cross-sectional, front elevational view of a valve embodying the present invention.
Figure 2:
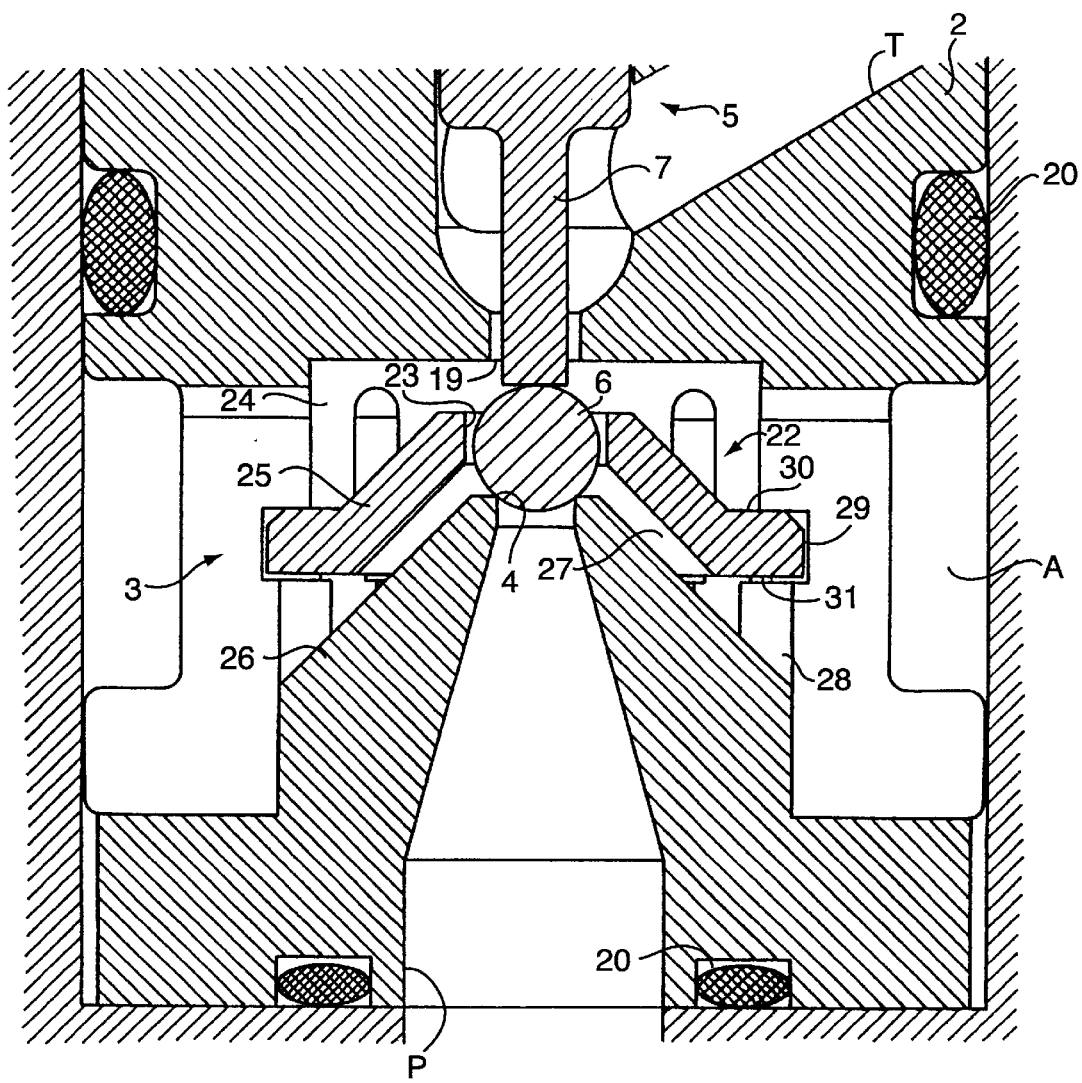
FIG. 2 an enlarged partial view of the valve according to FIG. 1

As shown in FIGS. 1 and 2, a valve 1 has a housing 2 with an inlet connection P and an outlet connection A. Between the inlet connection P and the outlet connection A, a shut-off device 3 is arranged, which has a valve seat 4 and a closure member 5. The closure member 5 has a closing element 6 in the shape of a ball, the ball defining a diameter in the range from 1 to 4 mm, in the present case approximately 2 mm however, the present invention is not limited in this regard, as other diameters may also be used. In the closed position shown in FIG. 1, the closing element 6 is pressed against the valve seat 4 by means of a tappet 7. Via an intermediary piece 8, the tappet 7 is loaded by a pressure spring 9, which is supported on an electromagnet 10 that is part of the drive of the tappet 7. Further, the electromagnetic drive has an armature 11, which is movable in a housing against the force of the spring 9. Thus, the armature 11 divides the interior of the housing into a first and second chambers 13 and 14, respectively. The chamber 14 not being visible, as the armature 11 bears on a bottom seal 15. When the armature is lifted, the second chamber 14 is formed between the armature 11 and the bottom seal 15. The electromagnet 10 can also be arranged elsewhere. For example, magnet coils may surround the housing 12. In this case, the pressure spring 9 is supported on an and stop.

When the electromagnet 10 is acted upon with current, the armature 11 moves upwards toward the electromagnet, until its shoulder 16 comes to rest on a sealing ring 17, which is arranged on the bottom side of the intermediary piece 8. In this connection, the armature 11 first performs an idle stroke a. During this idle stroke a, the fluid, which fills the housing 12, can flow through a gap 18, which exists between the armature 11 and the intermediary piece 8, from the first chamber 13 into the second chamber 14 to create a fluid cushion. In total, the armature 11 can travel a distance b, which is larger than the idle stroke a, before it comes to rest on the electromagnet 10. The difference (b-a) is then an effective stroke. During this effective stroke, the sealing ring 17 bears on the shoulder 16 of the armature 11 and blocks the passage from the first chamber 13 to the second chamber 14. This does not mean that the connection between the two chambers 13, 14 is completely blocked. Small leakages will remain through which fluid from the first chamber 13 can continue to flow into the second chamber 14. However, this fluid flow is heavily throttled.

When the intermediary piece 8 has been lifted off from the tappet 7, the pressure in the inlet connection P causes the closing element 6 to lift off from the valve seat 4, as it is no longer supported against this pressure. Fluid can thus flow from the inlet connection P to the outlet connection A.

After a predetermined movement, which is shorter than the effective stroke b-a, the closing element comes to rest against an auxiliary valve seat 19. In a manner not shown in detail, this auxiliary valve seat 19 is connected with a tank connection T. When the valve is closed, the fluid at the outlet connection A can flow off to the tank connection T, to prevent a continued dripping of fluid, when the valve is closed.

The closing process of the valve occurs in the opposite order. When the electromagnet 10 is de-energized, the armature 11 moves, via the biasing of the pressure spring 9, back to rest against the bottom seal 15. During the effective stroke, the sealing ring 17 again bears on the shoulder 16 of the armature 11, so that the connection between the first and second chambers 13, 14 is blocked, not taking into account small leakages. The return movement of the armature 11 into the starting position shown in FIG. 1 thus occurs with a heavy damping and an accordingly reduced speed, so that the load on the closing element 6 is kept small. Additionally, with armature 11 in a retracted position, the pressure in the second chamber 14 acts upon the tappet 7, which cooperates with the sealing ring 17. Thus, the tappet 7 is maintained in its bearing on the closing element 6. Also during the closing movement, the tappet 7 can hit the closing element 6 with a high speed. For reasons of completeness, it should also be mentioned that the gap 18 also continues in the area of the narrow passage, which is formed between the shoulder 16 and the lower end of the armature 11.

Shown schematically are several seals 20, 21, with which the housing 12 is sealed in relation to the housing 2. Further, particularly the seal 21 is able to adopt certain tolerances.

To ensure that the closing element 6 always reaches the valve seat 4 or the auxiliary valve seat 19, a guiding arrangement 22 is provided, which is shown in detail in FIG. 2. The guiding arrangement 22 has an opening 23, whose diameter is slightly larger the diameter defined by the closing element 6. The diameter of the opening 23 corresponds to the diameter of the closing element 6 plus a predetermined play. When the closing element 6 is lifted off from the valve seat 4, the direct path from the valve seat 4 to the auxiliary valve seat 19 is blocked, as the closing element 6 almost fills the opening 23. Accordingly, only a small part of the fluid can flow off through the tank connection T during the movement of the closing element 6.

The guiding arrangement 22, which is arranged in a retaining part 24 and thus retained in the housing 2, has a guide element 25 in the shape of a bowl, which opens in the direction of the valve seat 4. The valve seat 4 is arranged at the top of a pipe element 26, which has a conical outside. Accordingly, a gap 27 is formed between the pipe element 26 and the guide element 25, the gap 27 having, over a certain distance in the radial direction, a substantially constant thickness. At the radial end, the gap 27 has an expansion zone 28. Above the expansion zone 28, the guide element 25 has a flange 29, with which the guiding arrangement 22 is retained in the retaining part 24. For this purpose, the flange 29 has retaining surfaces 30, 31, which are directed perpendicularly to the pressure direction, which is defined by the fluid available the inlet connection P.

The guiding device 22 with the guide element forms a deflector, which improves the opening behaviour of the closing element 6. The guide element 25 forms a separation between a high pressure area, which is arranged between the pipe element 26 and the guide element 25 an a low pressure area on the other side of the guide element 25. Thus, the low pressure practically acts upon the upper side of the closing element 6 and causes a pressure drop. Thus, forces occur on the closing element 6, which reliably ensure that the closing element 6 can change its position from the valve seat 4 to the auxiliary valve seat 19. This compensates for the fact that only small forces can act upon the closing element 6 in the opening direction due to the small opening of the valve seat 4.

Both the guiding device 22 and the retaining part 24 are made of a plastic material, the material of the guiding device 22 having in particular been chosen so that it cooperates with the material of the closing element 6 with only little friction. The use of a retaining part 24 makes the working of the housing 2 and the mounting relatively easy.

The closing element 6 is preferably a commercially available steel ball with a diameter of about 2 mm, however, the present invention is not limited in this regard. The pressure drop over the valve is relatively small, meaning that the forces acting upon the ball will be accordingly small. Instead of a steel ball, also a ball made of another material can, of course, be used, for example plastic or ceramics.

The guiding device 22 has several tasks. It guides the closing element 6 on its way from the valve seat 4 to the auxiliary valve seat 19 and back. In addition, it causes a relatively high throttling of a fluid flow from the valve seat 4 to the auxiliary valve seat 19 in the period, during which the closing element 6 bears on neither of the valve seats 4, 9. The fluid leaving the valve seat 4 is first led through the gap 27 between the pipe element 26 and the guide element 25, that is, it is prevented from directly trespassing to the auxiliary valve seat 19.

The movement of the tappet 7 when closing the valve is heavily damped. The reason for this is, firstly, that the tappet 7 always bears on the closing element 6 and, secondly, that the return movement of the armature 11 can only take place at a heavily damped speed.

What is claimed is:

1. A valve comprising:

an inlet connection and an outlet connection, a shut-off device with a valve seat and a closure member positioned between the inlet and outlet connections said closure member having a closing element, and a tappet separate therefrom and adjacent thereto, said closing element being movable between a closed position where flow of a fluid between the inlet and outlet is prevented, and an open position wherein a flow path is established between the inlet and the outlet; and said closing element being held in a guiding arrangement including a guide element in the shape of a bowl opened in the direction of said valve seat and defining a single bore extending therethrough in which the closing element is positioned.

2. A valve as defined by claim 1, wherein said closing element is movable between an opened and closed position said closing element bearing on an auxiliary valve seat when said closing element is in said open position said auxiliary valve being connected to a tank connection, and wherein said guiding arrangement is located between said valve seat and said auxiliary valve seat.

3. A valve as defined by claim 1, wherein said guiding arrangement has an opening in which said closing element is arranged, the diameter of said opening being approximately equal to a diameter defined by said closing element plus a predetermined amount of play.

4. A valve as defined by claim 1, wherein said valve seat is arranged at the top of a pipe element that extends in the direction of said guide element.

5. A valve as defined by claim 4, wherein said guide element and said pipe element create a gap which is uniformly wide in a radial direction.

6. A valve as defined by claim 5, wherein an expanding zone is in communication with said gap, said expanding zone opening radially relative to said valve seat.

7. A valve as defined by claim 6, wherein said guide element has, adjacent to said expanding zone, a radially extending circumferential flange.

8. A valve as defined by claim 1, wherein said guiding arrangement is made of a plastic material.

9. A valve as defined by claim 1, wherein said guiding arrangement is fixed in a housing by means of a retaining part.

10. A valve as defined by claim 1, wherein said valve has a nominal output in the range from 1 to 51/mm.

11. A valve as defined by claim 1, wherein said closing element is in the form of a ball defining diameter in the range from about 1 to about 4 mm.

* * * * *

UNITED STATES PATENT AND TRADEMARK OFFICE
CERTIFICATE OF CORRECTION

PATENT NO. : 6,708,725 B2  
DATED : March 23, 2004  
INVENTOR(S) : Richard Entwistle et al.

It is certified that error appears in the above-identified patent and that said Letters Patent is hereby corrected as shown below:

<u>Column 6,</u>  
Line 34, please replace "51/mm" with -- 51/min. --

Signed and Sealed this

Eighth Day of June, 2004

JON W. DUDAS  
*Acting Director of the United States Patent and Trademark Office*